March 24, 1931.  A. McL. NICOLSON  1,798,101
ORIENTATION OF COMPONENT CRYSTALS IN COMPOSITE PIEZO ELECTRIC DEVICES
Filed Dec. 20, 1926  3 Sheets-Sheet 3

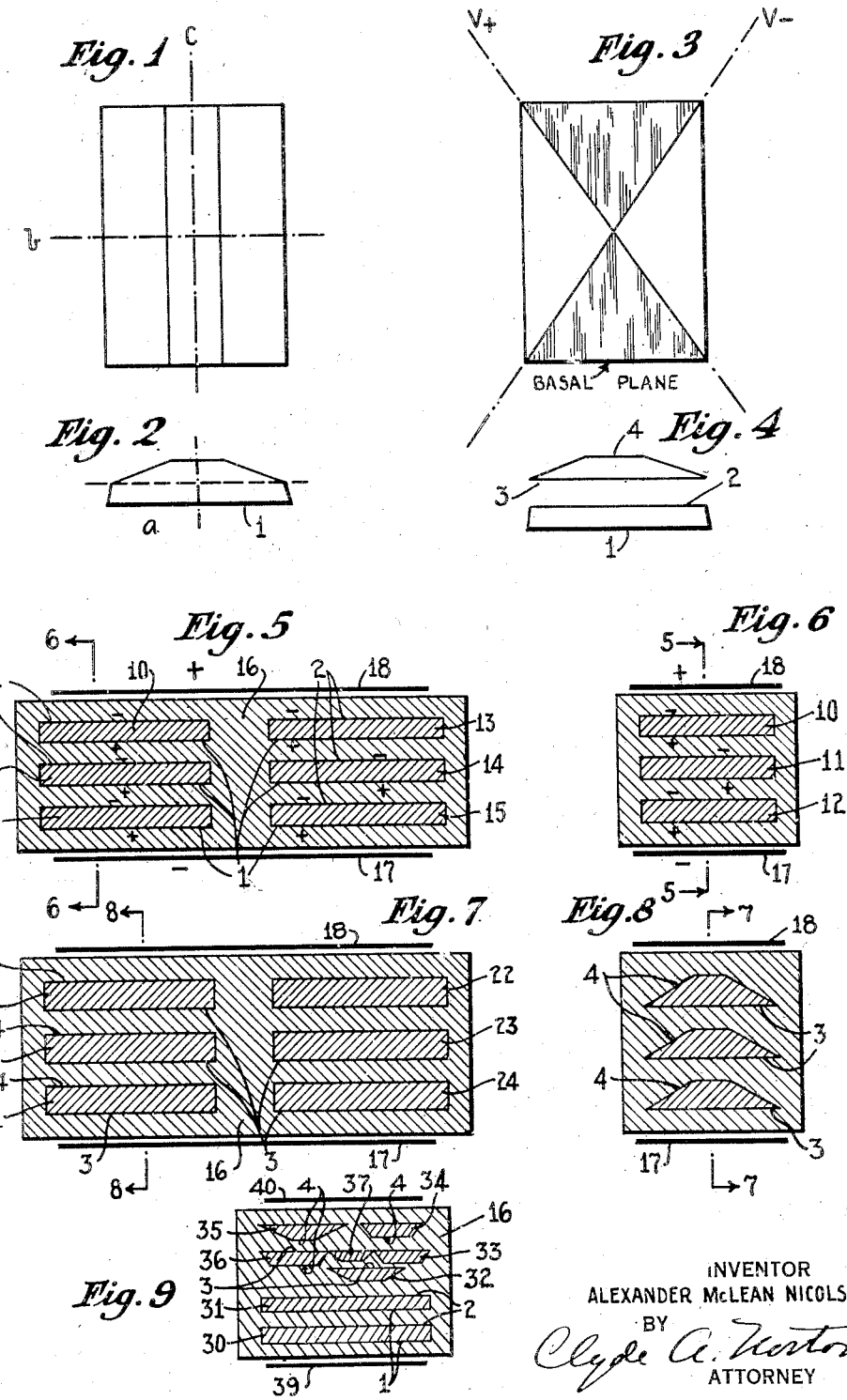

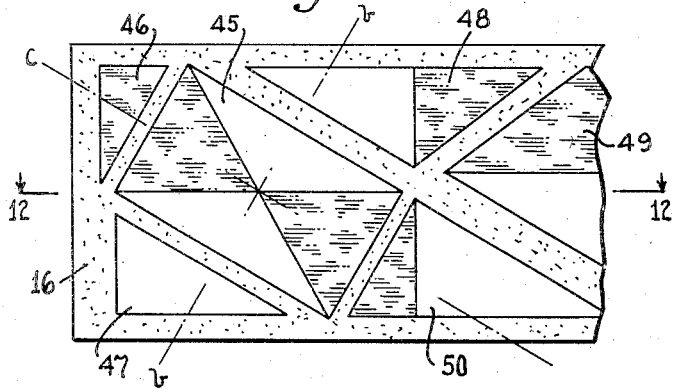
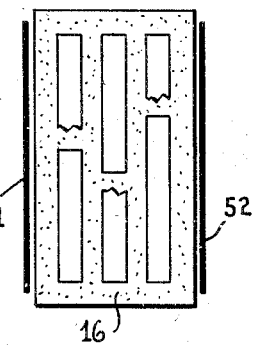
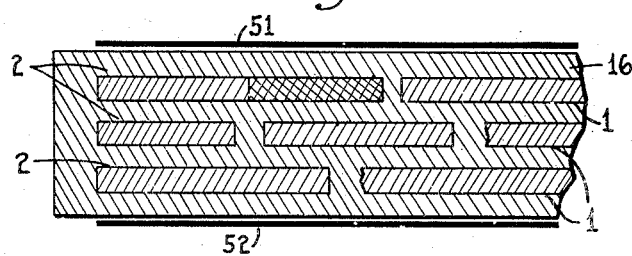
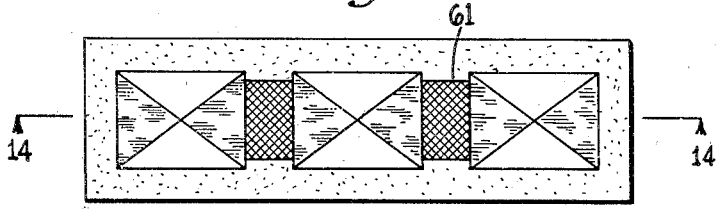
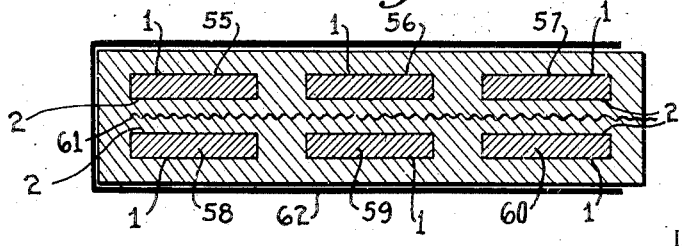

INVENTOR
ALEXANDER McLEAN NICOLSON
BY
ATTORNEY

Patented Mar. 24, 1931

1,798,101

UNITED STATES PATENT OFFICE

ALEXANDER McLEAN NICOLSON, OF NEW YORK, N. Y., ASSIGNOR TO COMMUNICATION PATENTS, INC., OF NEW YORK, N. Y., A CORPORATION OF DELAWARE

ORIENTATION OF COMPONENT CRYSTALS IN COMPOSITE PIEZO-ELECTRIC DEVICES

Application filed December 20, 1926. Serial No. 155,902.

This invention relates to composite piezo-electric crystal devices, and more particularly to such devices assembled from enantiomorphic organic crystals, such as Rochelle salt: and more particularly, to such crystals having "hour glass configuration", as discussed in my paper entitled "Piezo-Electric Effect" delivered before the American Physical Society and the American Institute of Electrical Engineers, on Oct. 9th, 1919.

It is an object of this invention to provide a composite piezo-electric crystal device which may be assembled from sections of such crystals taken parallel to the $b$ and $c$ axes.

It is a further object of this invention to provide arrangements of such crystals, particularly adapted for any desired mode of vibration.

It is still a further object of this invention to provide such a device which will not require the placing of individual electrodes on each of the component crystal sections.

Still other objects of this invention will be apparent from the specification.

Figure 15:
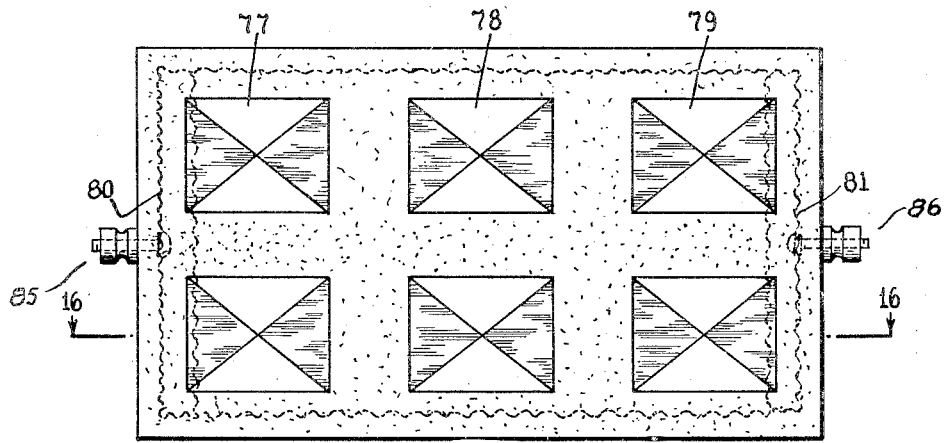
Figure 16:
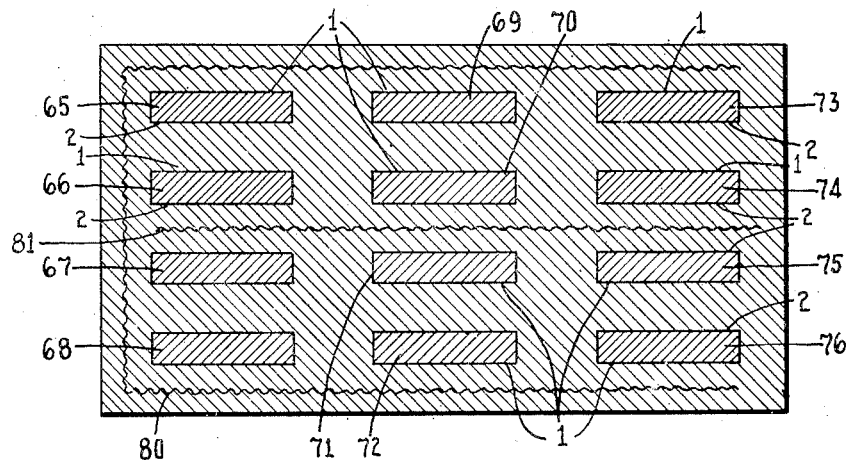

The features of novelty which I believe to be characteristic of my invention, are set forth with particularity in the appended claims. My invention itself, however, as to its practical embodiments and fundamental principles, will best be understood by referring to the specification and accompanying drawings, in which, Fig. 1 is a top plan view of a typical crystal of Rochelle salt of the "hour glass configuration", showing the $b$ and $c$ axes, Fig. 2, is an end elevation showing the $a$ axis, Fig. 3, is a bottom plan view thereof, showing the axes of longitudinal and transverse vibration, Fig. 4, is an end elevation thereof, showing the method of cutting such a crystal, Fig. 5, is a cross section on lines 5—5 of Fig. 6, of a composite piezo-electric crystal device according to my invention, Fig. 6, is a cross section thereof on lines 6—6 of Fig. 5, Fig. 7, is a sectional view on lines 7—7 of Fig. 8, of a modified form of composite device, Fig. 8, is a sectional view on lines 8—8 of Fig. 7, Fig. 9, is a sectional view corresponding to Figures 6 and 8, of a still further modified form of composite device according to my invention, Fig. 10, is a diagrammatic top plan view of a modified form of composite device according to my invention, particularly adapted for longitudinal and transverse vibration, Fig. 11, is a diagrammatic end view thereof, Fig. 12, is a section on lines 12—12 of Fig. 10, Fig. 13, is a diagrammatic plan view of a modified form of my invention, Fig. 14, is a section on lines 14—14 of Fig. 13, Fig. 15, is a diagrammatic plan view of a still further modified form of my invention, Fig. 16, is a sectional view on lines 16—16 of Fig. 15.

I have discovered that in crystals of the sort described, the electric polarization takes place between the outer surfaces of the crystal and the interior planes thereof, and best between the outer surface or surfaces and the interior planes containing the $c$ and $b$ axes. In every piezo electrical crystal there is a principal or optic axis. This is referred to in all cases as the $c$ axis. If a plate containing this axis be cut from any piezo crystal it will be apparent that there are an infinite number of possible sections corresponding to the rotation of the plane of the cut through 360°. If the plane of cutting is so selected that the plane of the cut contains the "macro" axis as well as the $c$ axis, the $b$ axis is parallel to the plane of the cut and normal to the $c$ axis. The $a$ axis is normal to the plane containing the $b$ and $c$ axes. These axes in the case of hexagonal systems are more frequently termed the $x$, $y$ and $c$ axes, the $x$ axis corresponding to the $a$ axis as above defined, the $b$ axis to the $y$ axis, while the $c$ axis is of course the same.

In the case of such a crystal, for example, a Rochelle salt crystal, exhibiting the "hour glass configuration", along one diagonal of the hour glass, the molecules of the crystal tend to contract when a charge is applied to the crystal, whereas, along the other diagonal, they tend to expand, and by reversing the sense of the charge, the mechanical effect is reversed: for example, if a section parallel to the $b$ and $c$ axes, be taken and a plus charge be applied to the external surface of the section, and a negative charge be applied to the interior face of the crystal, it will be found that one diagonal of the crystal such as V+ will increase in length and the other diagonal V— will decrease in length: if the polarity of the charge be reversed, the vibrations will be reversed, and the diagonal which previously increased will now decrease, and vice versa. From this it follows that the components may be assembled into a composite structure to provide any desired type of vibration, and it will be understood that the sections may be reversed in any sense by simultaneously reversing the electric polarization of charge applied.

It may be demonstrated as a result of what has already been stated, that physically securing groups of serially polarized sections or plates, results in alternate diagonal vibrations; that is, if a plurality of the cut sections be placed end to end and secured together and a single electrode having a charge of one sign be placed on one side of all of the sections and an oppositely charged electrode on the opposite side of all of the sections, the bar so formed will vibrate in a manner which is the sum of the vibrations of the individual crystals, which will be mechanically in phase, and which comprises expansion along one diagonal of each of the crystals and corresponding contraction upon the other diagonal.

If oppositely polarized pairs of cut sections be secured, the result of electrifying the the $b$—$c$ faces will be torsional deformations about the "$c$" axis. For example, if the sections are placed face to face, and a charge of one sign be applied to the two inside faces, and an opposite charge to the two external faces, one end of the composite crystals tends to rotate with respect to the other end, because the diagonal of the one crystal which is expanding is in line with the diagonal of the other crystal which is contracting: the result is a tendency of the two crystals to conform to an arc, the expanding diagonal on the outside. The same thing is taking place with respect to the other diagonals, in a reverse sense, the result of which is to produce a twisting of one end with respect to the other. The same principle may be utilized by physically securing opposed groups of serially polarized plates.

Referring now more particularly to Figs. 1 and 2, I have shown a typical Rochelle salt crystal, the bottom of which exhibits the configuration shown in Fig. 3. If now the crystal be cut according to the dotted line of Fig. 2, two sections will be formed, the lower section having an external face 1 and internal face 2, and the upper section having an external face 4 and an internal face 3.

If a plurality of similar crystals be cut as shown the lower section plates may be physically secured into a single entity, in a manner shown in Figs. 5 and 6, in which a plurality of such crystal sections 10, 11, 12, 13, 14 and 15, are physically secured into a single entity by arranging them with their $c$-axes parallel and pouring over them a piezo-electrically active binder, such for example, as what I term Rochelle salt "melt" comprising Rochelle salt which has been melted at a temperature controlled according to the amount of water of crystallization which it is desired to remove. After the binder 16 sets, the crystals are physically secured into a single entity and electrodes 17 and 18 may be applied to opposite sides; by reason of the high dielectric constant of the binder, it is not necessary to provide internal electrodes upon each crystal.

In applying "cement" or "melt" to such crystals, it should be remembered that excessive temperature differences between the crystal and the "melt" may cause cracking of the crystal. Therefore, the temperature of the "melt" and that of the crystal should be sufficiently near to avoid this effect. Accordingly, the "melt" may be made at 74° C., at which temperature the salt will retain substantially all its water of crystallization. The crystals will also be heated slowly to nearly this temperature, for example 60° C., or even as high as possible without melting the crystals, after which the "melt" may be poured upon the crystals without danger of cracking the crystal.

It will be noted that in these figures, the lower sections only are utilized, and the crystals are orientated with their interior surfaces faced the same way. The application of positive and negative charges to the electrodes 18 and 17 respectively, causes the development of charges as shown and causes mechanical vibration of each of the component crystals in phase, the one diagonal of all the crystals expanding while the opposite diagonal contracts. A similar arrangement may be produced by the utilization of the top sections of the crystals as shown in Figs. 7 and 8, in which crystals 19, 20, 21, 22, 23 and 24 are disposed as indicated, and provided with a binder 16 and electrodes 17 and 18. In this instance, as before, the crystals are symmetrically disposed with their upper faces all in the same direction.

It is possible to utilize both the upper and lower sections in the same composite device, as shown in Fig. 9, but with the provision of electrodes 39 and 40 as shown. The lower section crystals and the upper section crystals are inverted, that is to say, crystals 30 and 31 are provided with their interior faces 2 facing the upper surface 4 of the crystals 32, 33, 34, 35, 36 and 37.

Referring now to Figs. 10, 11 and 12, I have shown a form of composite device adapted to give a maximum longitudinal expansion and contraction: in this instance, sections 45, 46, 47, 48, 49 and 50, are similarly disposed with corresponding diagonals in line. For instance, the crystals will all be disposed with the interior or exterior faces the same way, and secured, as before, by means of the Rochelle salt melt. If now, the electrodes 51 and 52 be applied as shown in Figs. 11 and 12, the application of charges thereto will cause maximum longitudinal expansion and contraction, and of course, transverse vibration also.

Referring now to Figs. 13 and 14, I have shown a plurality of crystals 55 to 60 inclusive, arranged for torsional vibration: in this instance, an internal electrode 61 is provided, preferably of metal gauze, and the crystals are arranged with their corresponding interior faces 2 toward this electrode 61, although it will be understood that they may all be arranged with the exterior face 1 toward the electrode. An exterior electrode 62 is provided, and the charge is impressed between these electrodes, resulting in torsional vibration of the device.

Referring now to Figs. 15 and 16, I have shown an arrangement in which the various individual crystals of Figs. 13 and 14 are replaced by serially polarized pairs of crystals. In this instance, the component crystals 65 to 76 inclusive, are arranged in two groups, one group on each side of interior electrode 81 and with corresponding faces of the crystals in each group facing the same way, but opposite to the crystals of the other group. An external electrode 80 may be provided, and the impression of a charge between the said electrodes will cause torsional vibration of the device, the magnitude of which will be proportional to the length of the bar.

Suitable terminals, such for example as binding posts 85 and 86 may be attached to the electrodes of the composite device in any suitable way, as for example by being electrically connected to electrodes 80 and 81 respectively and partially covered by the binder before the "setting" thereof, so that when the setting takes place, the terminals are firmly secured in place.

While I have shown and described certain forms of my invention, it will be understood that the principles herein disclosed, may be applied in other forms, and that modifications may be made, as will be understood by those skilled in the art, without departing from the spirit and scope of my invention. It is also to be understood that the crystal devices herein discussed are reversible in the sense that the application of stresses produces charges, just as the application of charges produces stresses.

It is also to be understood that binders other than piezo-electrically active binders may be utilized, such as hard wax or glass, the latter being utilized when high melting point piezo-electric crystals such as quartz and tourmaline, are utilized.

Also, it will be understood that the electrodes may be applied either touching the component crystals or spaced therefrom by interposed dielectric binder, and that master electrodes may be applied either internally as in Figs. 15 and 16, or just on the surface, as in Figs. 5 and 6, and in the latter case, may be held in place by solidification of the binder or may be applied after such solidification and held in place by any suitable means, such as shellac.

I claim:

1. A composite piezo-electric crystal device comprising a plurality of symmetrical crystal sections, arranged in line parallel to the $a$-axis and with the $c$-axes parallel, and physically secured into a single entity by means of a hard and resilient binder enveloping said crystals.

2. A composite piezo-electric crystal device, comprising a plurality of component crystals cut from Rochelle salt crystals parallel to the $b$ and $c$ axes thereof, and arranged with the $c$-axes parallel, and physically secured into a single entity by means of a piezo-electrically active binder enveloping said components.

3. A composite piezo-electric crystal device, particularly adapted for a longitudinal and transverse mechanical vibration, comprising a plurality of chemically and optically similar piezo-electric crystal sections arranged with analogous diagonals in line.

4. A composite piezo-electric crystal device, particularly adapted for longitudinal and transverse mechanical vibration, comprising a plurality of chemically and optically similar piezo-electric crystals arranged with analogous diagonals in line, and physically secured into a single entity by piezo-electrically active binder enveloping said crystals.

5. A composite piezo-electric crystal device, comprising a plurality of component Rochelle salt crystal sections and formed parallel to the $b$ and $c$ axes, and arranged with analogous diagonals in line and physically secured into a single entity by piezo-electrically active binder enveloping said crystals.

6. A composite piezo-electric crystal device, particularly adapted for torsional vibration, comprising an internal electrode and a plurality of similar piezo-electric crystal sections disposed on opposite sides of said electrode, with corresponding sides facing each other and with the c-axes parallel, a piezo-electrically active binder disposed around said crystals and electrode, and an electrode associated with the exterior sides of said crystals.

7. A composite piezo-electric device, comprising an internal electrode and a plurality of similar piezo-electric crystal sections arranged parallel to the c-axes and to the a-axes on each side of said internal electrode, the crystals on opposite sides of said electrode being disposed with corresponding faces toward each other, a piezo-electrically active binder securing said crystals, and an electrode associated with the exterior side of the exterior row of crystals.

8. A composite piezo-electric device particularly adapted for alternate diagonal vibration, comprising a plurality of serially polarized piezo-electric crystal sections, formed parallel to the b and c axes, and physically secured into a single entity.

9. A piezo-electric crystal device, particularly adapted for torsional vibrations, comprising oppositely polarized pairs of piezo-electric crystal sections, formed parallel to the b and c axes thereof, and physically secured into a single entity.

10. A piezo-electric crystal device, particularly adapted for torsional vibration, comprising opposed groups of serially polarized piezo-electric crystal sections, formed parallel to the b and c axes thereof, and physically secured into a single entity.

In testimony whereof I hereunto affix my signature.

ALEXANDER McLEAN NICOLSON.